United States Patent [19]
Robinson

[11] Patent Number: 5,383,779
[45] Date of Patent: Jan. 24, 1995

[54] APPARATUS FOR FORMING A LIGHTWEIGHT PLASTIC BOTTLE

[75] Inventor: Gerald R. Robinson, Perrysburg, Ohio

[73] Assignee: Owens-Illinois Plastic Products Inc., Toledo, Ohio

[21] Appl. No.: 156,566

[22] Filed: Nov. 22, 1993

Related U.S. Application Data

[62] Division of Ser. No. 811,552, Dec. 20, 1991, Pat. No. 5,275,780, which is a division of Ser. No. 594,807, Oct. 9, 1990, Pat. No. 5,086,937.

[51] Int. Cl.$^6$ .................................. B29C 49/18
[52] U.S. Cl. ........................ 425/525; 425/530; 425/532
[58] Field of Search ............ 425/525, 530, 532; 264/523, 529, 539–541, 530, 534; 215/1 C, 100 A; 220/710.5, 771, 751–754

[56] References Cited

U.S. PATENT DOCUMENTS

| | | | |
|---|---|---|---|
| 2,804,654 | 9/1957 | Sherman | 264/163 |
| 2,953,817 | 9/1960 | Miller et al. | 264/529 |
| 3,012,286 | 12/1961 | Gasmire | 264/529 |
| 3,019,480 | 2/1962 | Soubier | 264/539 |
| 3,100,576 | 8/1963 | Frank | 215/1 C |
| 3,159,697 | 12/1964 | Tocci | 215/1 C |
| 3,163,544 | 12/1964 | Valyi | 215/1 C |
| 3,212,681 | 10/1965 | Weikert | 222/183 |
| 3,277,223 | 10/1966 | Curto | 264/529 |
| 3,285,454 | 11/1966 | Bailey | 215/100 A |
| 3,362,043 | 1/1968 | Langdon et al. | 264/539 X |
| 3,369,690 | 2/1968 | Hayes | 264/540 X |
| 3,399,424 | 9/1968 | Sheptak | 264/529 |
| 3,400,846 | 9/1968 | Kelly | 215/1 C |
| 3,441,172 | 4/1969 | Dike | 215/100 A |
| 3,499,567 | 3/1970 | Spotts | 215/31 |
| 3,564,087 | 2/1971 | Ruekberg | 264/529 |
| 3,638,835 | 2/1972 | Goodrich et al. | 222/107 |
| 3,781,395 | 12/1973 | Uhlig | 264/327 X |
| 3,983,199 | 9/1976 | Uhlig | 264/161 X |
| 4,395,378 | 7/1983 | Alberghini et al. | 264/532 |
| 4,463,867 | 8/1984 | Nagel | 220/270 |
| 4,523,904 | 6/1985 | Martin | 425/539 |
| 4,549,865 | 10/1985 | Myers | 425/540 X |
| 4,648,831 | 3/1987 | Johnson | 425/540 |
| 4,759,454 | 7/1988 | Nowicki et al. | 215/12.1 |
| 4,816,093 | 3/1989 | Robbins, III | 156/69 |
| 4,836,970 | 6/1989 | Robbins, III | 264/515 |
| 4,879,146 | 11/1989 | Johnson | 215/1 C |
| 4,930,644 | 6/1990 | Robbins, III | 215/1 C |
| 4,979,628 | 12/1990 | Robbins, III | 215/1 C |
| 5,013,517 | 5/1991 | Robbins, III | 264/515 |
| 5,021,209 | 6/1991 | Dickinson | 264/540 |
| 5,035,604 | 7/1991 | Rathman et al. | 425/525 |
| 5,087,406 | 2/1992 | Krall et al. | 264/512 |

FOREIGN PATENT DOCUMENTS

| | | | |
|---|---|---|---|
| 216316 | 11/1956 | Australia | 215/1 C |
| 62-55486 | 11/1987 | Japan | 215/100 A |
| 887635 | 1/1962 | United Kingdom | 215/1 C |
| 974596 | 1/1964 | United Kingdom | 264/541 |
| 1523309 | 8/1978 | United Kingdom | |
| 2041286A | 9/1980 | United Kingdom | |

*Primary Examiner*—Richard L. Chiesa

[57] ABSTRACT

Apparatus for forming a lightweight plastic bottle having a body and an integral handle includes pre-blowing a tubular parison positioned between partible blow mold sections, closing the blow mold sections to compression mold the handle and blowing the parison to form the body integral with the handle and a line of juncture between the body and the handle.

5 Claims, 9 Drawing Sheets

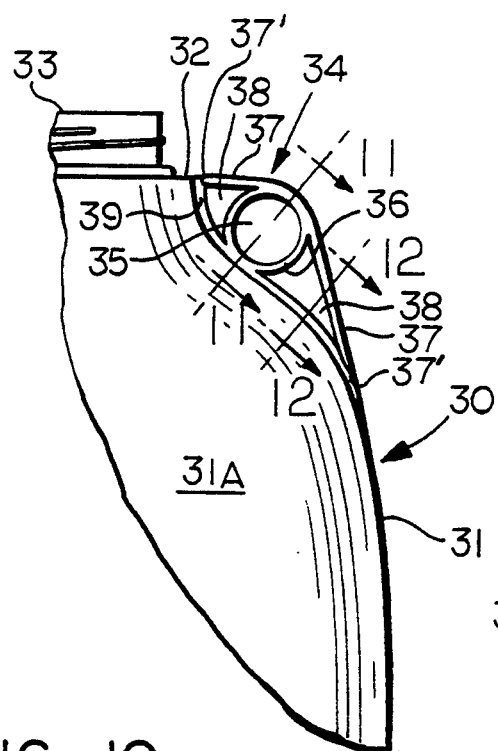
FIG. 10
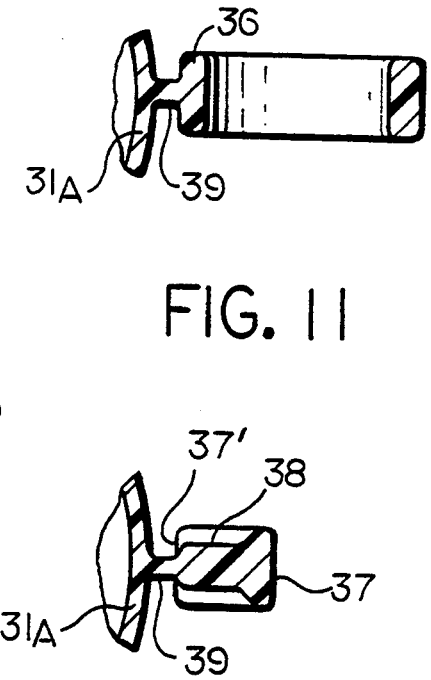
FIG. 11
FIG. 12
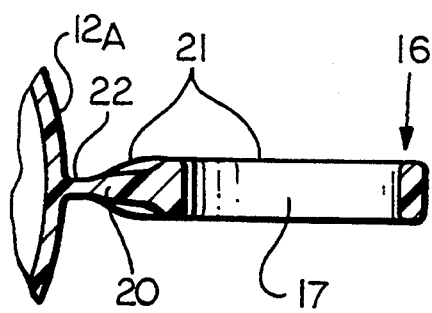
FIG. 9
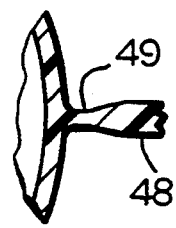
FIG. 13A
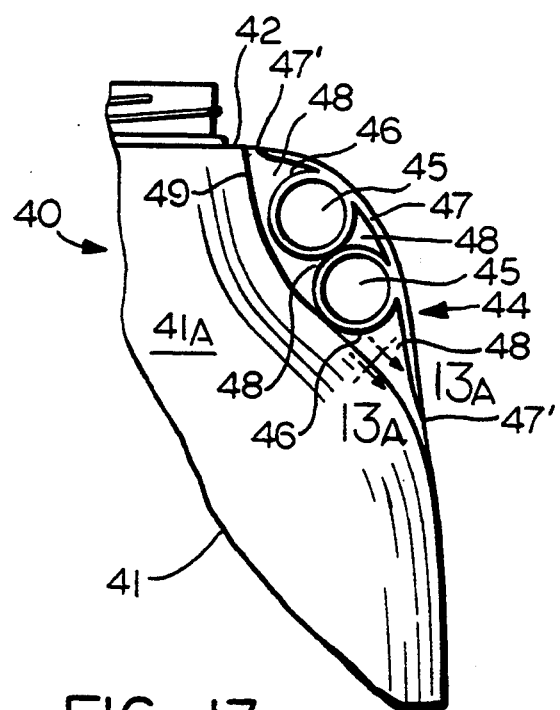
FIG. 13

APPARATUS FOR FORMING A LIGHTWEIGHT PLASTIC BOTTLE

CROSS-REFERENCE TO RELATED APPLICATION

This is a divisional application of copending application Ser. No.: 07/811,552, filed Dec. 20, 1991, now U.S. Pat. No. 5,275,780, which is a divisional application of Ser. No.: 07/594,807, filed Oct. 9, 1990, now U.S. Pat. No. 5,086,937.

BACKGROUND ART

The present invention relates to an ultra lightweight plastic bottle and to a method and apparatus for forming such bottle. In the utilization of plastic bottles for packaging, one of the primary objects has always been to provide a bottle or other plastic package which utilizes as little plastic as possible and still permits the package to reach its intended market intact in a form which is convenient to use. Although attempts have been made to package products in flexible plastic bags including pouches and the so-called bag-in-a-box which has been utilized for packaging wine, for packages of 1 quart to 1 gallon in size, such flexible packaging has seen limited use. The reason for this appears to be that many of the products packaged in those sizes of containers are detergents and other common household products and the consumer desires to have a bottle, preferably one with a handle, for use in packaging such products.

More recently, there has appeared on the market a one-liter film plastic pouch marketed under the name "Enviro-Pak" (Trademark of The Procter & Gamble Company) which is used for packaging a fabric softener concentrate. Upon opening, the entire contents are intended to be placed in a more rigid plastic or other container.

DISCLOSURE OF INVENTION

The present invention relates to a plastic bottle which has upper and lower portions of sufficient thickness to provide rigidity required for a defined molded shape but which has a greatly reduced thickness in the central body portion, for example, a thickness on the order of that utilized in film, namely, in the range of 0.008 inch.

In one embodiment of the present invention the bottle may have a wall thickness in the center area which is so thin that grasping the bottle in that area will cause the wall in such area to deform to an extent which is unacceptable unless supported by some supplementary means. Such supplementary supporting means will usually be a label affixed to the center area; however, whether labelled or not, when filled with product and sealed, the product contained therein and sealed air of other gas in the headspace provides the support needed to permit a filled bottle of the present invention to stand upright. If labelled, the label may be heat sealed or adhesively affixed but preferably is affixed by in-mold labelling such as disclosed in U.S. Pat. Nos. 4,624,722 and 4,636,166 which are incorporated herein by reference. Preferably, the bottle has a solid handle compression molded integrally with the upper body portion or shoulder, said body portion or shoulder having a greater thickness than the central body portion. Such integral compression molded handle permits the bottle to be readily grasped and the contents to be poured therefrom without the risk of prematurely expelling the contents. Thus, the thinness of the center area wall portion is such that if a filled bottle is uncapped and grasped in that area with a force as needed to lift the bottle, it will deform to such an extent as to expel some of the liquid out of the neck prior to moving the bottle to the desired pouring position. The present invention also relates to a method and apparatus for forming such bottle in one piece, with all portions including the handle molded as an integral, in situ molded unit.

Accordingly, it is an object of the present invention to provide a plastic bottle which has upper and lower portions having wall thicknesses sufficiently great to give such portions rigidity capable of maintaining their "as-molded" shapes during handling whether empty or filled and a central portion integral with said upper and lower portions and having a greatly reduced thickness such as to be incapable of maintaining its "as-molded" shape during handling without supplementary supporting means.

It is a further object of the present invention to provide such a bottle with an integral handle to facilitate handling and dispensing the product therefrom.

It is yet another object of the present invention to provide a method and apparatus for forming, in one operation, a plastic bottle having a shaped bottom and a shaped upper portion, each having a thickness capable of retaining the "as-molded" shape and having a central portion molded integrally therewith, the thickness of which is greatly reduced from that of the upper and lower portions.

It is yet another object of the present invention to provide a method and apparatus for forming such bottle with an integral solid handle.

It is another object of the present invention to provide such a bottle in combination with a label affixed to said central portion, preferably by in-mold labelling.

In forming the bottle of the present invention, a tubular parison is extruded from an extrusion die head and, while the parison is in heated, moldable condition but before the blow mold halves are closed therearound, the parison is pre-blown to expand the parison radially to position plastic material in an area where it will be enclosed within the handle cavity of the blow mold halves in order to compression mold the handle portion when the blow mold halves close around the parison. The handle and the handle cavity of the mold have a configuration which causes the handle to be compression molded therein in solid form. After closing of the blow mold halves and compression molding of the handle, pressurized air is introduced into the parison to form the blown portions of the bottle, including an upper body or shoulder portion adjacent the neck. The handle is formed solid, preferably with an enlarged bead at its outer periphery which extends the full length of the handle except the end portions adjoining the upper body or shoulder which are of reduced thickness. For those bottles having handles which are relatively thick in the web areas adjacent the upper body or shoulder, say a thickness greater than 0.050 inches, it is desirable that such handles be provided with a ribbon or line of reduced thickness, on the order of 0.038 to 0.045 inch, at the line of juncture between the handle and shoulder of the bottle in order to prevent pressurized air from reaching the interior of the handle during the blow molding step. The neck portion of the bottle may be formed either by blow molding or injection molding. If the bottle is labelled by in-mold labelling, the label is placed in the mold halves prior to their closing around the parison.

The plastic bottle of the present invention can be formed on a number of different types of blow molding machines including a wheel-type blow molding machine, such as described in U.S. Pat. Nos. 4,523,904; 4,549,865 and 4,648,831 and on machines in which a portion such as the neck, is injection molded in a partible injection mold which then carries such injection molded portion and a tubular parison as it is extruded upwardly between partible blow mold halves which are then closed therearound and the parison blown therein to form the bottle. Examples of such machines are disclosed in the following U.S. Pat. Nos. 3,029,471; 3,019,480 and 3,008,192.

The concept of pre-blowing a parison for various reasons including that of getting plastic material radially outwardly into alignment with a handle cavity of a partible blow mold is disclosed in the prior art including the following U.S. Pat. Nos.: 2,953,817; 3,012,286 and 3,983,199.

BRIEF DESCRIPTION OF THE DRAWINGS

FIG. 9 is a sectional view taken through line 9—9 of FIG. 1.

FIG. 10 is a fragmentary elevational view of the bottle of the present invention showing a modified handle configuration.

FIG. 11 is a sectional view taken through line 11—11 of FIG. 10.

FIG. 12 is a sectional view taken through line 12—12 of FIG. 10.

FIG. 13 is a view similar to FIG. 10 showing yet a different handle configuration.

FIG. 13A is a sectional view taken through line 13A—13A of FIG. 13.

DETAILED DESCRIPTION OF THE PREFERRED EMBODIMENTS

Figure 1:
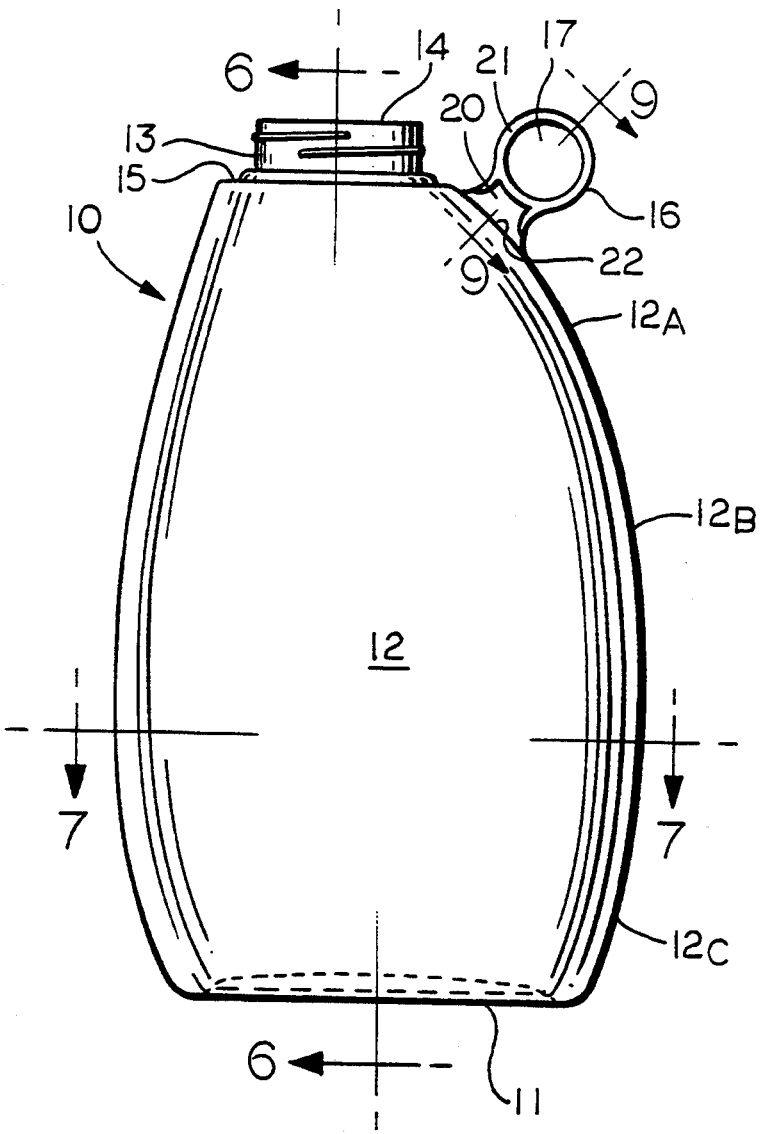
FIG. 1 is an elevational view of the bottle of the present invention.
Figure 2:
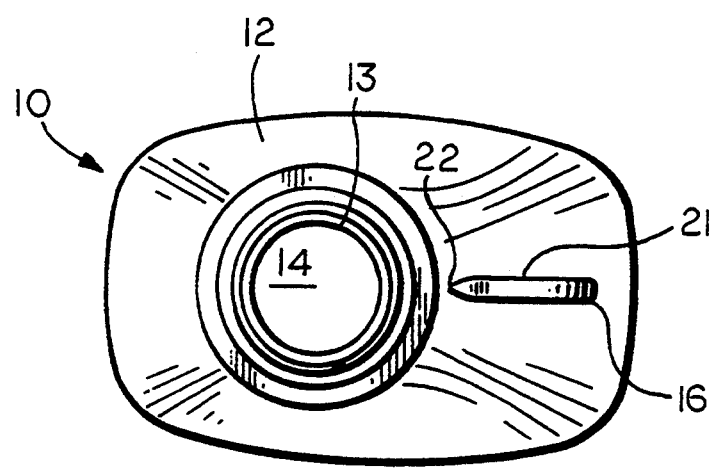
FIG. 2 is a top plan view of the bottle shown in FIG. 1.
Figure 3:
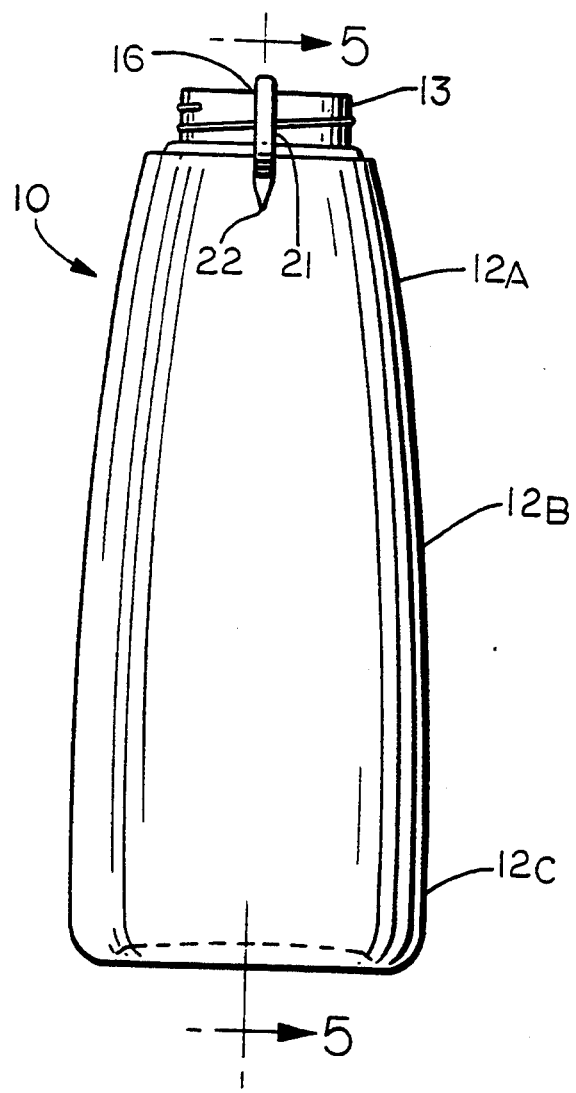
FIG. 3 is an end view of the bottle shown in FIG. 1.
Figure 4:
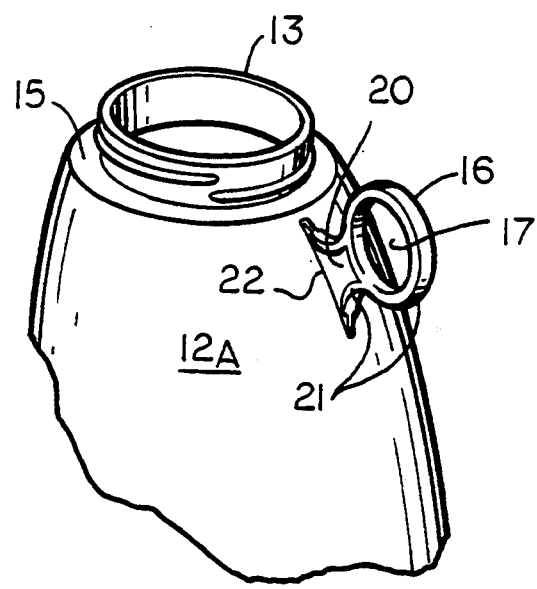
FIG. 4 is a fragmentary perspective view of the upper portion of the bottle shown in FIG. 1.
Figure 5:
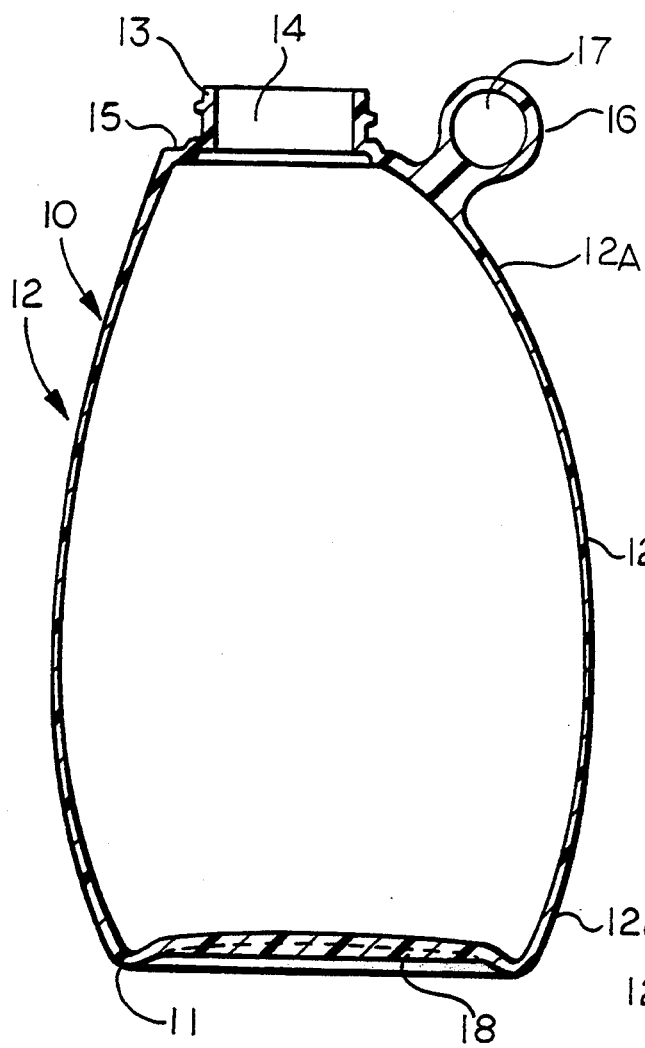
FIG. 5 is a sectional view taken through line 5—5 of FIG. 3.
Figure 6:
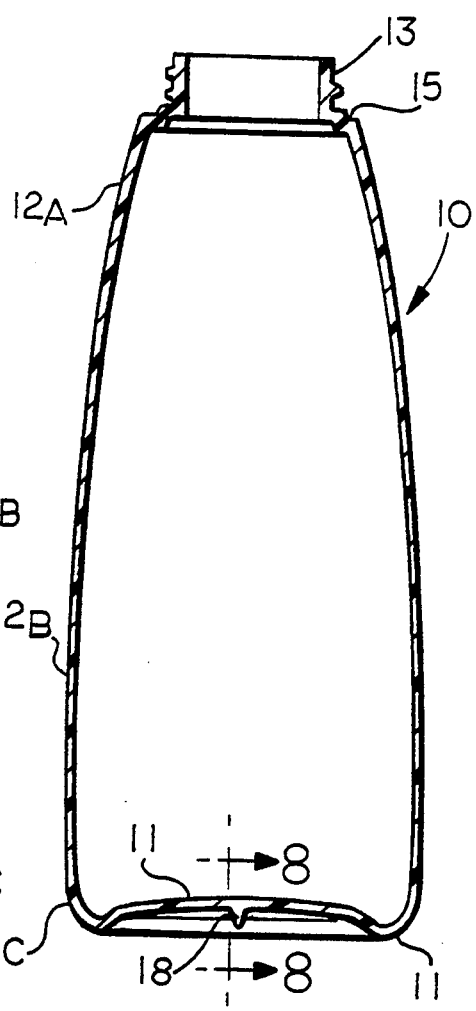
FIG. 6 is a sectional view taken through line 6—6 of FIG. 1.
Figure 7:
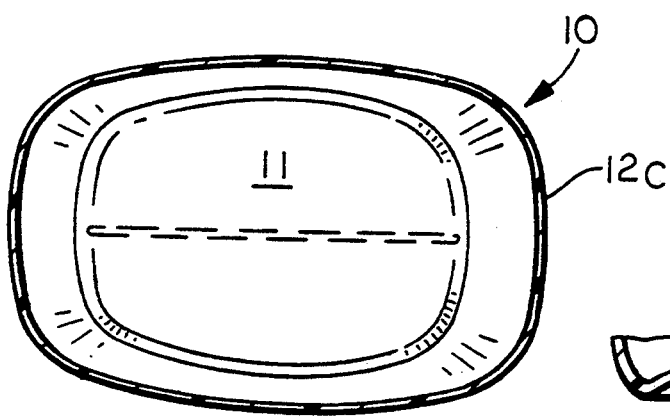
FIG. 7 is a sectional view taken through line 7—7 of FIG. 1.
Figure 8:
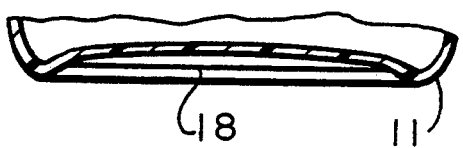
FIG. 8 is a sectional view taken through line 8—8 of FIG. 6.

Referring now to FIGS. 1–9, there is provided a bottle generally designated by the number 10 having a bottom or base portion 11, a body portion 12 extending upwardly from the base portion and a neck or finish portion 13 extending upwardly from the body portion 12 and having an opening 14 through which contents of the bottle may be dispensed. A ledge 15 joins the neck 13 to the body 12. The bottle is preferably formed of high density polyethylene; however, it could be formed of a wide variety of other thermoplastic materials such as polypropylene, low density polyethylene and polyvinyl chloride. As may be seen in the drawings, there is also provided a handle 16 which is integrally formed with and extends from the upper body portion 12A (i.e., the shoulder) in an area adjacent the neck 13.

The handle 16 is formed integrally with the body portion 12 and is compression molded within the handle cavity of a mold as will be hereinafter described. The handle 16 has a finger hole opening 17 to permit the bottle 10 to be readily grasped and carried.

Referring to FIGS. 5–8, the body portion 12 has three fairly distinct areas including an upper area 12A which has a target minimum wall thickness in the area of 0.015–0.020 inch and an average wall thickness of 0.020–0.030 inch. Preferably, that portion of the upper area 12A from which the handle 16 extends has a wall thickness on the order of 0.020–0.030 inch.

The body portion 12 also includes a central area 12B which has a thickness on the order of 0.008 inch which approximates the thickness of a flexible film. The thinness of the central area 12B results in that area having limited ability to maintain its "as-molded" shape during handling when grasped in that area unless there is some additional supporting means such as a label affixed to such area or support resulting from having product and sealed air or other gas in the headspace. In contrast, the upper and lower areas 12A and 12C have thicknesses providing sufficient strength and rigidity to permit their handling without significantly deforming their "as-molded" shapes. For some bottles, there may even be a tendency for the upper area 12A and neck 13 of an empty, unsealed bottle 10 to droop at least slightly from the axis of the neck as molded. Thus, if the central area 12B is thin enough, it may be incapable of holding the upper portion 12A of the body and the handle 16 and neck 12 in the same upright position in which molded without some additional supporting means and yet be capable of containing liquid product.

The lower area 12C of the bottle has a greater wall thickness than the central area 12B with a target minimum thickness on the order of 0.010 to 0.015 inch and an average wall thickness of 0.020 to 0.040 inch. Thus, the upper and lower areas 12A and 12C, respectively, of the body 12 have sufficient rigidity to maintain a shape with normal deformation expected for a plastic bottle during handling while the central area 12B, by virtue of its greatly reduced thickness, lacks any substantial rigidity.

The base 11 has a target minimum thickness of 0.015–0.025 inch with an average thickness of 0.020–0.040 inch. Preferably, the base 11 has a central rib 18 extending laterally across the bottle 10 to provide additional rigidity in that area.

Referring now to FIGS. 1–4 and 9, the handle 16 extends outwardly from the upper area 12A and includes an inner web portion 20 and an outer portion of maximum breadth 21 which encircles the finger hole opening 17 and extends on opposite sides of the web portion 20 to a position near but spaced from the wall of the upper area 12A. The handle 16 also has a line of juncture 22 of significantly reduced thickness from the web portion 20 joining the handle 16 to the upper area 12A. As can be seen in FIGS. 1–4 and 9, the portion of maximum breadth 21 does not extend to the body portion upper area 12A but rather is separated from it by the reduced thickness line of juncture 22.

The portion of maximum breadth 21 may have any of a wide variety of thickness ranges as determined by the desired comfort to the fingers of the persons gripping the handle 16 and the desired rigidity of the handle. While it is preferred that the portion of maximum breadth 21 have a greater thickness than the web 20, it could be as thin as the web 20 or as thick as ¼ to ½ inch. The thickness of the web 20 in the embodiment of FIGS. 1–4 and 9 is preferably in the range of 0.050 to 0.060 inch. The thickness at the line of juncture 22 is in the range of 0.038 to 0.045 inch. As will become clearer from the description of the method and apparatus for forming the bottle of the present invention to be hereinafter described, the feature of providing the line of juncture 22 with thickness in the range of 0.038 to 0.045 inch or less enhances the ability to compression mold a solid handle throughout the web portion 20 and portion of maximum breadth 21 and minimizes the chances of pressurized air from getting into the handle 16 during the blow molding operation. Thus, if any air or pressurized air became entrapped in the handle 16, that would serve to greatly weaken the structural integrity of the handle 16 and its ability to support the bottle being carried. Obviously, the area of reduced thickness 22 must have sufficient thickness to provide good support and as pointed out above should be on the order of 0.038 to 0.045 inches.

Referring now to FIGS. 10–17, there are shown several different types of handle configurations. Thus, in FIGS. 10–12 there is provided a bottle 30 with a body portion 31 having an upper area 31A defining a shoulder terminating in a horizontal ledge 32 from which a neck 33 extends. The bottle 30 of this embodiment has a handle 34 which extends from the horizontal ledge 32 adjacent the neck 33 to a point where the sloping shoulder of the upper area 31A flows to an approximately vertical extent. The handle 34 includes (1) a finger hole opening 35 defined by a circular portion of maximum breadth 36 and (2) secondary portions of maximum breadth 37 and a pair of web portions 38 on opposite sides of the finger hole 35 which are joined to the circular portion of maximum breadth 36 and to the secondary portions of maximum breadth 37. A line of juncture 39 joins the web 38 and the tangent of the circular portion of maximum breadth 36 to the upper area 31A of the bottle 30. Preferably, the line of juncture 39 has a thickness which is reduced from that of the web 38; however, if the web 38 has a thickness not to exceed approximately 0.045 inch, the line of juncture 39 can be the same thickness. Under no circumstances, however, should the secondary portions of maximum breadth 37 extend to the wall of the body portion upper area 31A. Thus, there will be a gap between the ends 37' of the secondary portion of maximum breadth 37 and the wall at the upper area 31A of the body portion.

FIG. 13 shows a bottle 40 having a shape somewhat similar to the bottle of FIG. 10 but having a handle 44 with two finger gripping apertures 45. This bottle also has a horizontal ledge 42 and a body portion having an upper area 41A with the handle 44 extending from the horizontal ledge 42 to the wall of the body portion upper area 41A. The handle 44 of this embodiment has two circular portions of maximum breadth 46 and a secondary portion of maximum breadth 47. Four web sections 48 and a line of juncture 49 join the handle 44 to the body portion upper area 41A. The secondary portion of maximum breadth 47 terminates before reaching the wall of the upper portion 41A with the result that the ends 47' are spaced from the wall of the upper area 41A.

Figures 14, 15:
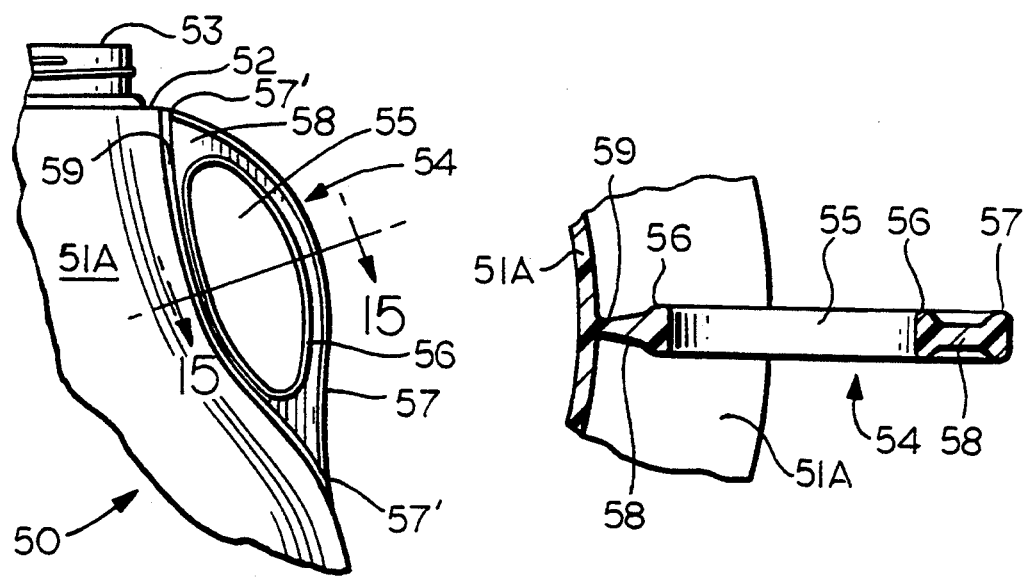
FIG. 14 is a view similar to FIGS. 10 and 13 showing yet another handle configuration.
FIG. 15 is a sectional view taken through line 15—15 of FIG. 14.

Referring now to FIGS. 14 and 15, there is shown another embodiment in which there is provided a bottle 50 having a body portion with an upper area 51A, a horizontal ledge 52 and a neck 53. A handle 54 is provided having an elongated hand opening 55 extending from the ledge 52 to a point on the body portion upper area 51A. Under this embodiment, there is provided a first portion of maximum breadth 56 around the hand opening 55 and a secondary portion of maximum breadth 57 extending from a point near the ledge 52 to a point near the body portion upper area 51A. The secondary portion 57 has ends 57' which are spaced from the wall of the upper area 51a. A web 58 extends between the first and second areas of maximum breadth 56 and 57 and is joined to the body portion upper area 51A at a line of juncture 59 of reduced thickness.

Figures 16, 17:
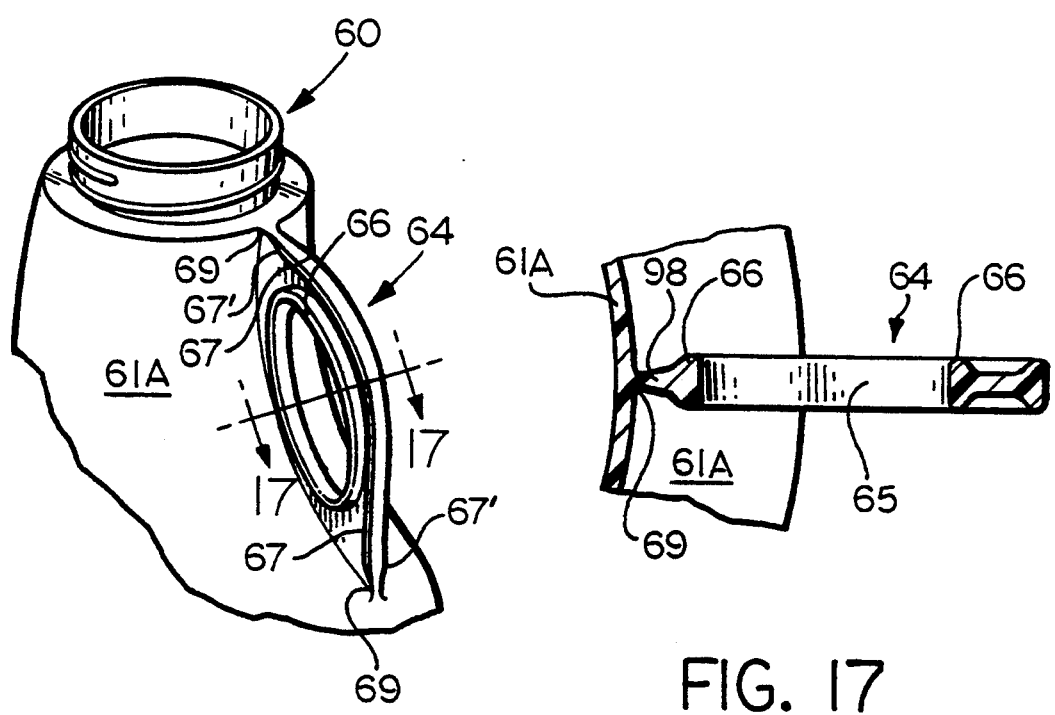
FIG. 16 is a fragmentary perspective view of a bottle having still another type of handle configuration.
FIG. 17 is a sectional view taken through line 17—17 of FIG. 16.

Referring now to FIGS. 16 and 17, there is shown a bottle 60 with a handle 64 similar to that of the bottle shown in the embodiment FIGS. 14 and 15 except that it has a web portion 98 which tapers to a minimum thickness at its juncture 69 with the body portion upper area 61A. Thus, it has first area of maximum breadth 66 around the hand opening 65 and a secondary portion of maximum breadth 67 extending from opposite ends 67' near but spaced from the body portion upper area 61A. As can be seen in FIG. 16, the secondary portion of maximum breadth 67 does not extend to the side wall of the body portion upper area 61A but rather simply fades out at the opposite ends 67', tapering to the minimum thickness at the line of juncture 69.

Referring now to FIGS. 18–25, there will be described one method and apparatus for molding the bottle of the present invention. This is a machine operating according to the principles described in U.S. Pat. Nos. 2,804,654 and 3,019,480. The apparatus includes an extrusion die 70 having a die head 71 with an annular orifice 72 through which heated and plasticized material may be extruded. Positioned above the die head 71 is an injection head 73 having an injection mold 74 mounted thereon. The injection head 73 is supported by means not shown for raising and lowering it and the injection mold 74 from a position at which the injection mold 74 is firmly in engagement with the die head 71, to a raised position. The injection mold 74 has a cavity (not shown) aligned to receive plastic material from the orifice 72 of the die head when the injection head is in the lowered, engaged position. Such construction permits heated and plasticized thermoplastic material to be injection molded from the die head 71 through its orifice 72 and into the mold cavity of the injection mold 74. Upon completion of such injection molding step, the injection head 73 is raised as plasticized material continues to be expelled through the orifice 72 in the form of a tubular parison 75 which is supported and carried upwardly by the injection mold 74.

A pair of partible mold halves 76 are mounted on opposite sides of the path followed by the injection head 73 in a position to close around the tubular parison 75 at the appropriate stage in the cycle when the injection head 73 is in the raised position. The injection head 73 includes a passageway 68 which extends through the injection mold 74 for introducing pressurized air into the tubular parison. In order to compression mold the handle portion, for example, the handle 16 in the embodiment of the bottle shown in FIGS. 1-4, it is desirable to introduce such pressurized air into the tubular parison 75 in stages, the first of which is prior to closing the blow mold halves 76 around such tubular parison 75. The introduction of pressurized air into the parison 75 at a selected time prior to closing the mold halves 76 serves to pre-blow and, thus, expand a selected portion 75A of the parison to a radial extent such that it will be enclosed within the handle cavity of the blow mold halves 76 when they close. As previously mentioned the concept of pre-blowing a parison is disclosed in U.S. Pat. Nos. 2,953,817; 3,012,286 and 3,983,199.

Figure 18:
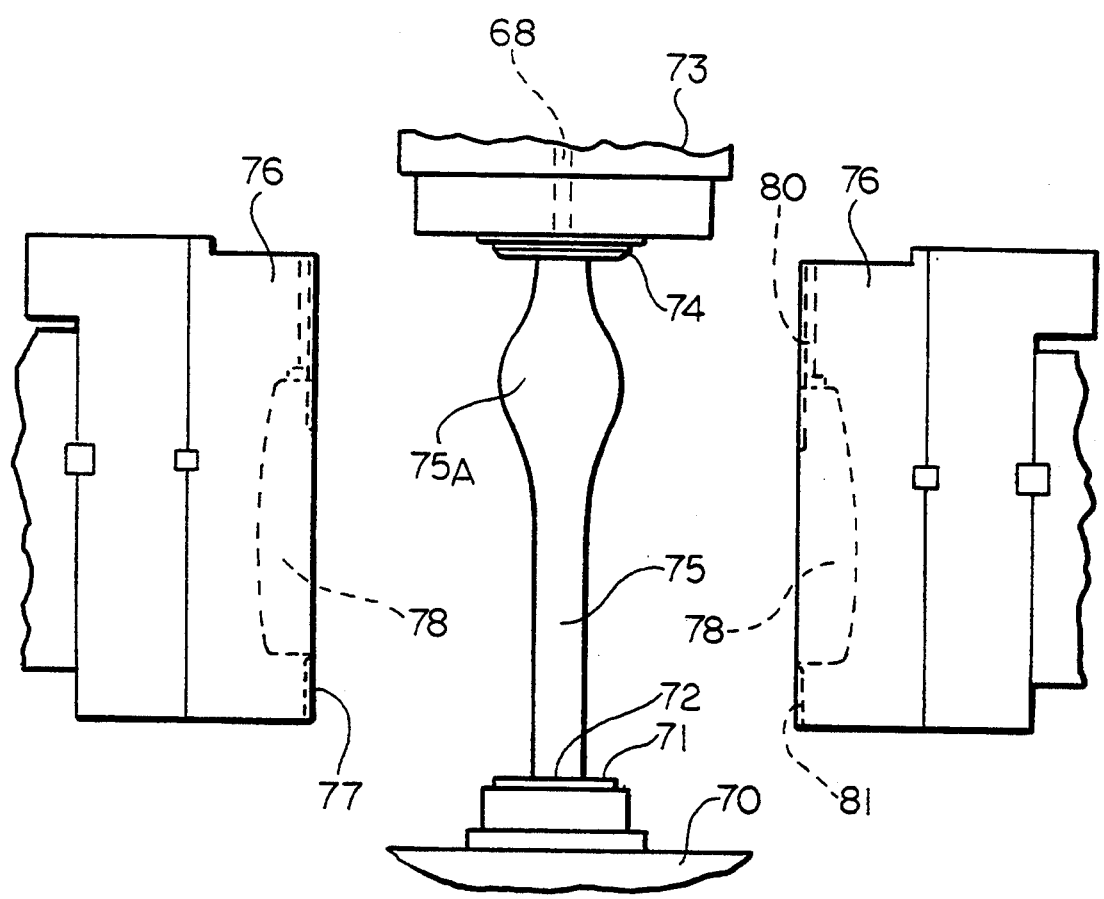
FIG. 18 is a schematic elevational view showing one type of blow molding machine which could be utilized to form the bottle of the present invention showing a length of plasticized tubing extending between a raised injection mold and an extrusion die head and positioned between the open halves of a blow mold.

The mold halves 76 are provided with mating surfaces 77 which contact one another when the mold halves 76 are in the closed position. Cut into each of the mold halves 76 are (1) a blow cavity 78 conforming to the desired configuration of the bottle, body and neck portion when the mold halves 76 are closed, (2) a handle cavity 79, (3) an upper waste cavity 80 at the top and (4) a lower waste cavity 81 at the bottom which provide recesses into which excess plastic may flow upon closing of the blow mold halves 76 around the tubular parison 75. Following closing of the blow mold halves 76, pressurized air is introduced through the passageway 68 and into the upper end of the tubular parison 75 to expand that portion of the parison 75 captured within the closed mold halves 76 into conformity with the cavity 78. As previously mentioned, the closing of the mold halves 76 compression molds the handle in the handle cavity. As can be seen in FIG. 18, the portion of the waste cavity 80 above the top of the blow cavity is recessed deeper (i.e., farther away from the mating surfaces 77) so that, upon closing of the mold halves 76, there will still be an open path for pressurized air to flow from the passageway 68 to the mold cavity 78.

Figure 19:
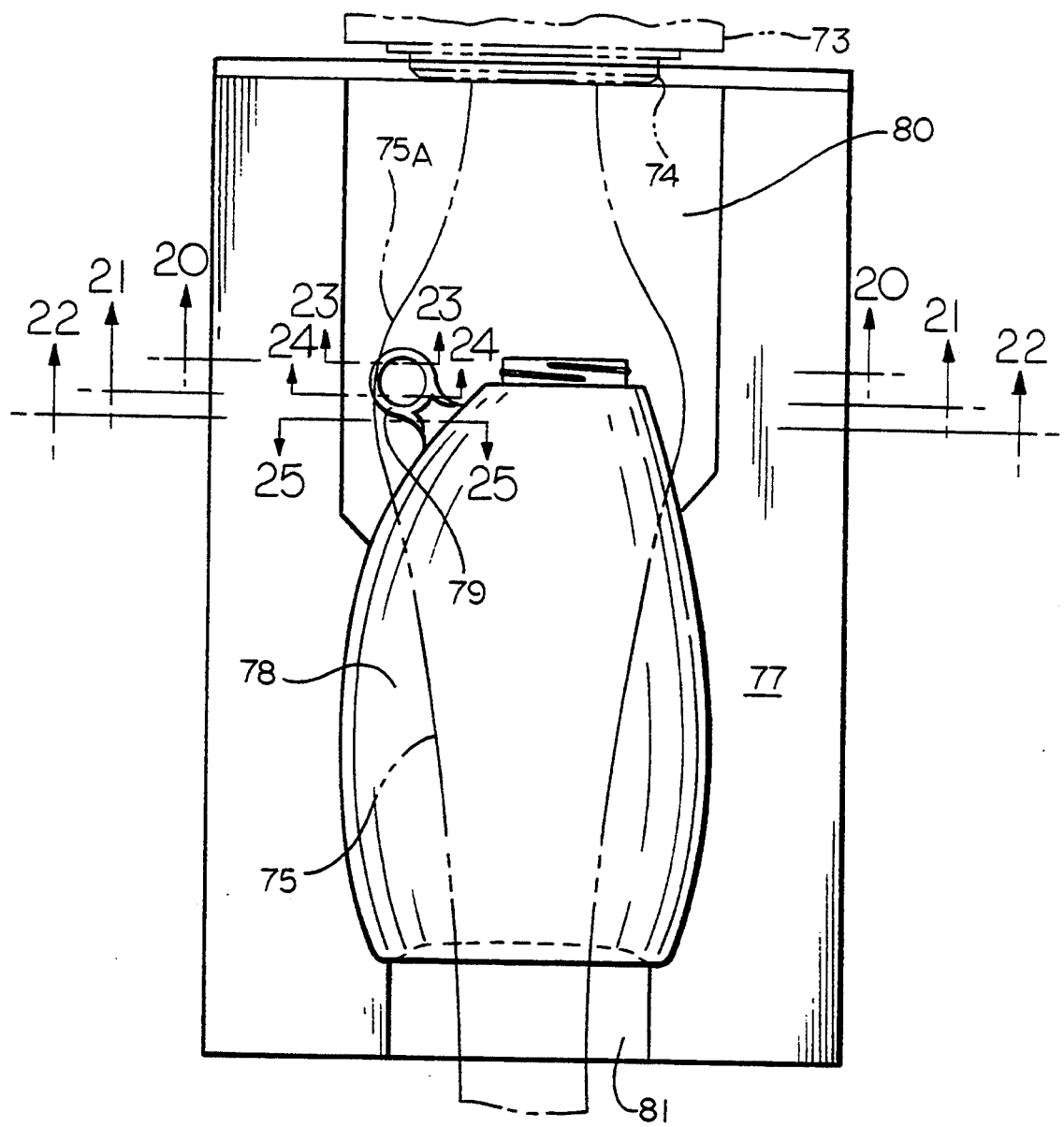
FIG. 19 is a view of one-half of the open blow mold of FIG. 18 showing in phantom a length of plasticized tubing positioned between it and other blow mold half.
Figure 20:
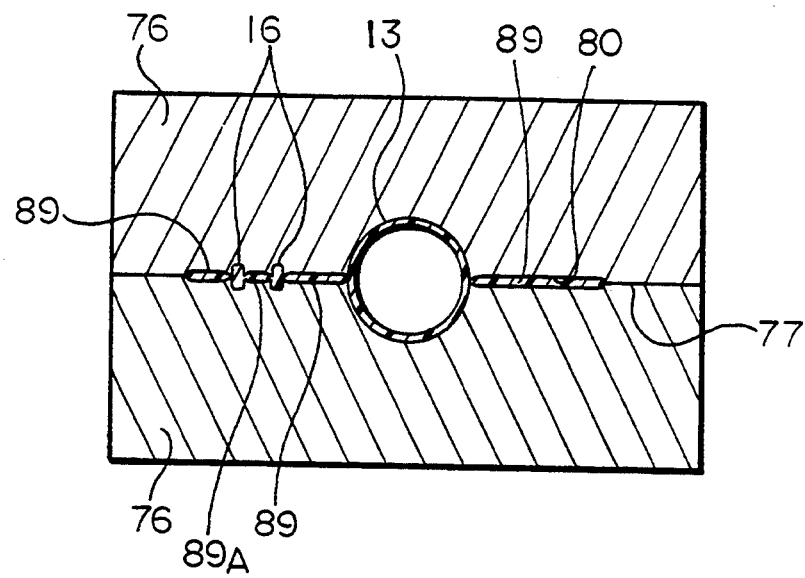
FIG. 20 is a sectional view taken in the area shown by line 20—20 of FIG. 19 after closing the mold halves and blow molding of the bottle therein.
Figure 21:
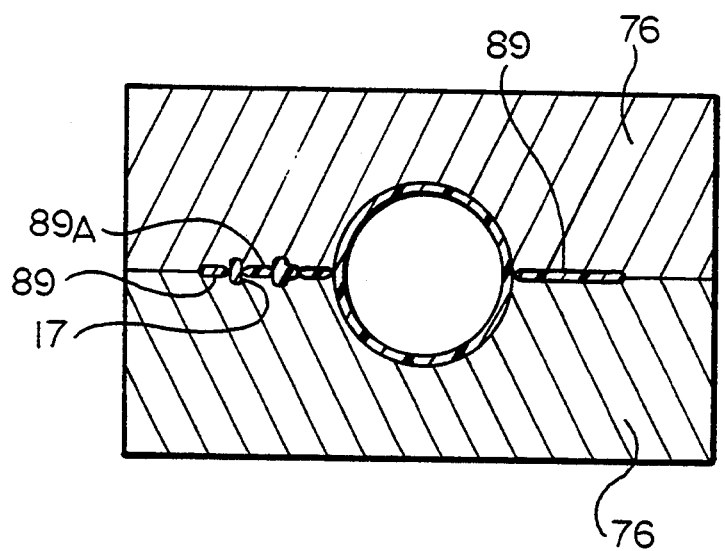
FIG. 21 is a view similar to FIG. 20 in the area shown by line 21—21 of FIG. 19.
Figure 22:
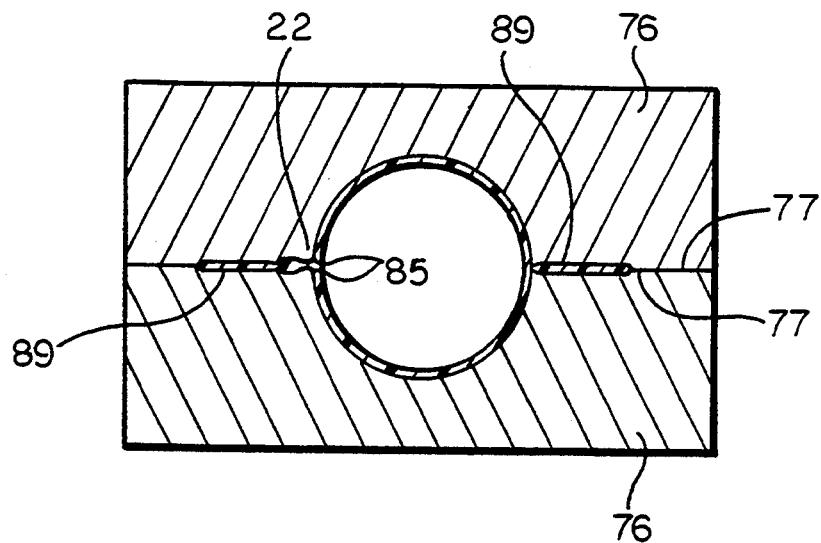
FIG. 22 is a view similar to FIG. 20 in the area shown by line 22—22 of FIG. 19.

As can be seen in FIGS. 19 and 20, in forming a bottle having a configuration of the bottle 10 shown in FIGS. 1-4, upon completion of the blow molding there will be formed the neck 13, the handle 16 and flash or waste material 89 which will be trimmed in a separate trimming operation. Flash 89A is also formed in the finger hole opening 17 of the handle 16. Additionally, the portion of the mold halves 76 forming the line of juncture 22 of reduced thickness are contoured toward one another as at 85 as shown in FIG. 22.

Figures 23, 24, 25:
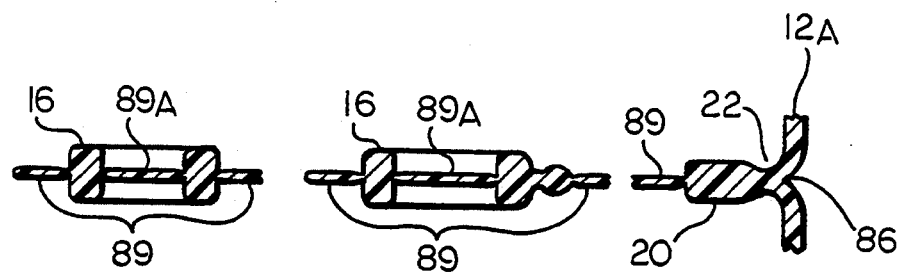
FIG. 23 is a sectional view taken in the area shown by line 23—23 of FIG. 19 of the handle portion of a newly formed bottle after removal from the blow mold but prior to trimming the flash therefrom.
FIGS. 24 and 25 are views similar to FIG. 23 taken in the area shown by lines 24—24 and 25—25, respectively.

FIGS. 23, 24 and 25 show the respective portions of the bottle as molded prior to trimming but after removal from the mold. As noted particularly at FIG. 25, the wall forming the body portion 12 at the upper area 12A at the line of juncture 22 has a tendency to be pushed into the handle area as illustrated by the dimple 86. As will be appreciated, if the line of juncture 22 has a thickness of greater than about 0.045 inch, the pressurized air could push into the handle cavity area creating an undesirable air bubble therein.

In operation, the injection head 73 is initially lowered to a position at which the injection mold 74 engages the die head 71 with an opening to the injection cavity aligned with the orifice 72 of the die head 71. Plasticized material is then injection molded into the injection mold 74 and the injection head 73 is then lifted as plasticized material continues to be expelled or extruded from the die orifice 72 in the form of a tubular parison 75. At a point in time during such lifting, a small amount of pressurized fluid is introduced therein to pre-blow and thereby expand at area 75A which is to be aligned with the handle cavity 79 of the mold halves 76 in which the handle 16 is to be compression molded. Following completion of the extrusion step and raising of the injection mold 74 above the blow mold halves 76, the blow mold halves 76 are caused to close around the tubular parison 75 compression molding the plastic material in the pre-blown area 75A in the handle cavity 79. Thereafter, pressurized air is introduced through passageway 68 to expand the portion of the parison 75 contained within the blow mold cavity 78 into conformity with such blow cavity. Following this step the blow mold halves 76 are opened, the bottle with the flash thereon removed from the mold cavity 78 and injection head 73 returned to engagement with the die head 71 for beginning of a new cycle. The bottle then has the flash 89 and 89A trimmed therefrom to form the finished article.

Figure 26:
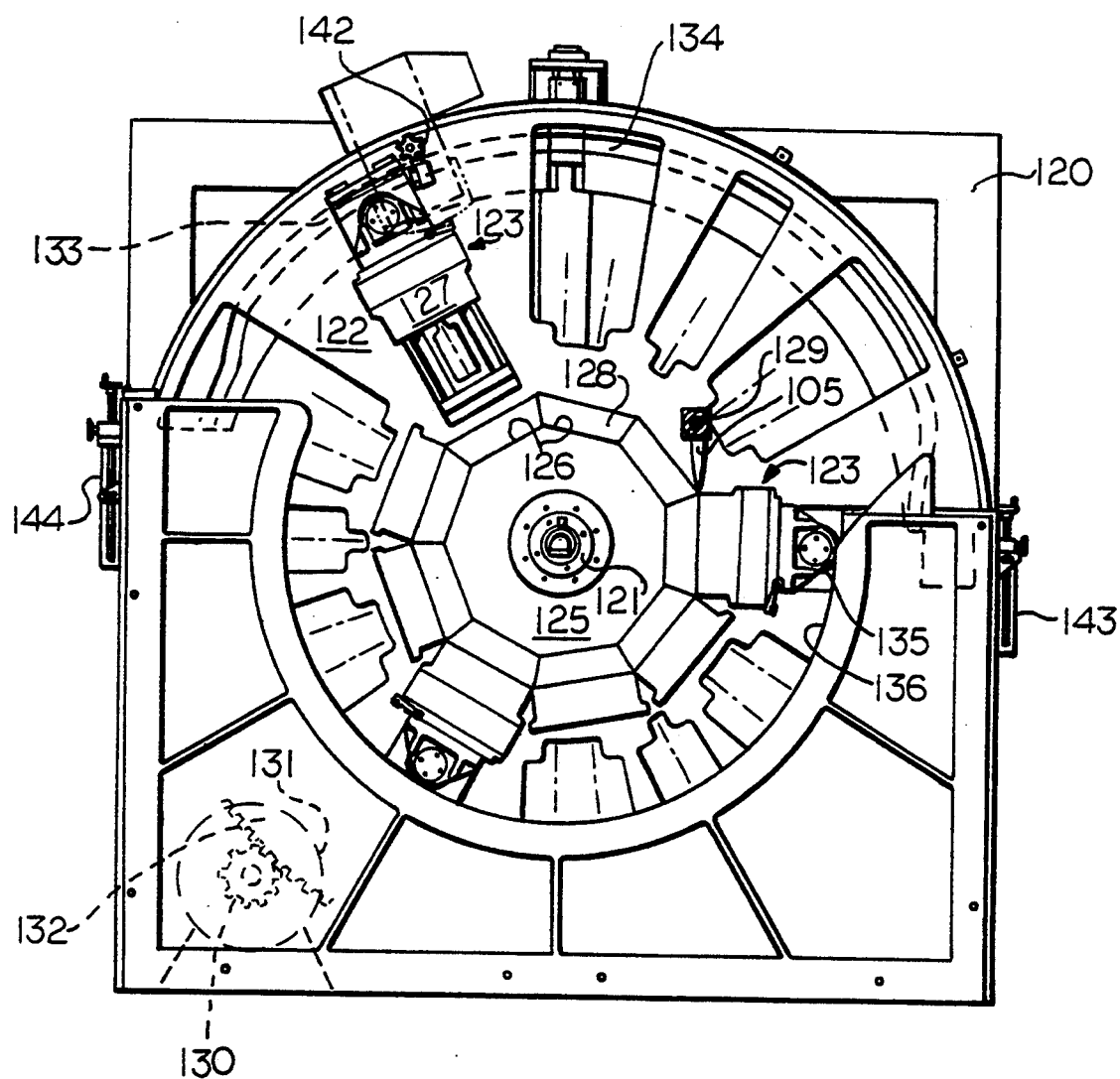
FIG. 26 is a elevational view of another type blow molding machine which may be utilized in forming the bottle of the present invention.

Referring now to FIG. 26, the wheel-type blow molding machine which may be utilized for forming the bottle of the present invention comprises a frame 120 in which a shaft 1 21 is mounted for rotation about a horizontal axis. A wheel plate 122 is mounted on the shaft 121 for rotation with the shaft 121 and supports a plurality of circumferentially spaced slide assemblies 123. A hub 125 is also mounted on the shaft for rotation with the shaft and has a plurality of circumferentially spaced mold supporting surfaces 126 corresponding in number to the number of slide assemblies 123.

Each slide assembly 123 supports a first section or part 127 of mold and the corresponding surface 126 of the hub 125 supports the second section 128 of a mold. Each slide assembly 123 is adapted to move the mold section 127 toward and away from the other mold section 128 to close about a heated parison 105 emanating from an extruded head 129 so that the parison can be blown to the shape of the mold cavity defined by the mold sections 127, 128 as the wheel rotates. The parison 105 is provided from the head 129 of an extruder in the two o'clock position as shown in FIG. 26.

Wheel plate 122 is rotated by a gear 130 driven by a motor 131 and meshing with a gear 132 on the periphery of the wheel plate. Each slide assembly 123 includes a cam follower 133 which engages a fixed arcuate cam 134 on the frame 120 to move mold section 127 toward and away from mold section 128. A second cam follower 135 on each slide assembly 123 engages a second fixed cam 136 on frame 120 to hold the mold sections 127, 128 in closed position. Second can 136 extends generally from the three o'clock position to the nine o'clock position.

An air valve 142 is provided on each slide assembly 123 and is actuated by an actuator 143 along the path of the molds that functions to turn the blow air on for blowing the article and another actuator 144 is provided along the path to function to turn the air valve 142 off cutting off the flow of blow air to the parison enclosed in the mold sections 127, 128. This type of blow molding machine is described in greater detail in the following U.S. patents which are assigned to the assignee of the present invention and are incorporated herein by reference: U.S. Pat. Nos. 4,523,904; 4,549,865 and 4,648,831.

In addition, means are provided for pre-blowing the parison after it emanates from the extruder head and before it is enclosed within the mold sections 127, 128. As in the previous machine, the purpose of the pre-blowing step is to get a portion of the plastic material aligned with the handle cavity of the blow mold sections 127, 128 where it will be compression molded in such handle cavity as the blow mold sections 127, 128 close therearound. In order to accomplish such pre-blowing, the extruder head 129 is provided with a central air passageway opening to the interior of parison 105 as it is extruded.

In operation the plastic material is continuously extruded from the head 129 of the extruder in the form of a tubular parison 105 and flows downwardly between the mold sections 127, 128. As the wheel plate continues to rotate, the mold sections 127, 128 are brought together pinching the plastic material and air is supplied to the interior of the tubular prison to blow the article in a manner well known in the art.

Prior to closing the mold sections 127, 128 a puff of pressurized air is introduced into the parison 105. The timing and amount of pressurized air introduced in the pre-blowing step prior to closing the mold sections 127, 128 is programmed to cause plastic material to be expanded to a position where it can be compression molded in the handle cavity as the mold sections 127, 128 close therearound. Thereafter, pressurized air is introduced through a needle to expand the parison in the cavity of the mold sections 127, 128. As the article reaches the position when the blow mold is open (twelve o'clock position as viewed in FIG. 26) an ejector ejects the bottles onto a conveyor.

I claim:

1. Apparatus for blow molding a plastic bottle having a base including a bottom intended to rest upon a supporting surface, an integral body portion extending upwardly from said base and including a central area, a shoulder portion above said central area and a neck extending upwardly from said shoulder portion, said shoulder portion having an integral handle extending therefrom, said apparatus comprising:
   (a) an extrusion die for forming a tubular parison in heated moldable condition;
   (b) means for positioning said parison between partible blow mold sections, said sections, when closed having a cavity with (i) a first portion defining a bottom forming surface, a body forming surface and a neck forming surface lying on an axis and (ii) a second portion defining the shape of said handle, said second portion being offset with respect to said axis and said neck forming surface and communicating with said first portion throughout a line of juncture of reduced size defined by a third portion;
   (c) an air supply for introducing low pressure gas into said parison to pre-blow (i) that portion of said parison intended to form said integral handle to a radial extent to be captured within said cavity second portion upon closing of said mold sections and that, upon expanding in said cavity first portion, said shoulder portion will have a target minimum thickness of 0.015 inch and a target average thickness between 0.020 inch and 0.030 inch and (ii) that portion of said parison intended to form said central area to cause such parison portion to thin to an extent such that, upon expanding in said cavity first portion, said central area will have a target maximum thickness of 0.012 inch;
   (d) means for closing said partible blow mold sections around said pre-blown parison to enclose a major portion thereof in said cavity first portion while compression molding a minor portion in said cavity second portion to form a solid handle;
   (e) means for introducing high pressure gas into that portion of the mold enclosed parison lying within said cavity first portion; and
   (f) a restrictor for preventing high pressure gas from entering that portion of said parison enclosed within said cavity second portion, said restrictor forming a single line of juncture between the handle and the shoulder which is thinner throughout its entire length than the portion of the handle adjacent thereto.

2. Apparatus according to claim 1, wherein said handle has an enlarged bead at its outer periphery and said restrictor separates said enlarged bead from said shoulder.

3. Apparatus according to claim 1, further including a fourth portion of said blow mold sections defining a waste receiving cavity adjacent said second portion.

4. Apparatus according to claim 1, wherein said third portion defines a line of juncture having a maximum thickness not to exceed 0.045 inches.

5. Apparatus according to claim 4, wherein said handle has an enlarged bead at its outer periphery and said line of juncture separates said enlarged bead from said shoulder.

* * * * *